United States Patent
Peters et al.

(10) Patent No.: US 8,688,448 B2
(45) Date of Patent: *Apr. 1, 2014

(54) TEXT SEGMENTATION AND LABEL ASSIGNMENT WITH USER INTERACTION BY MEANS OF TOPIC SPECIFIC LANGUAGE MODELS AND TOPIC-SPECIFIC LABEL STATISTICS

(75) Inventors: Jochen Peters, Aachen (DE); Evgeny Matusov, Aachen (DE); Carsten Meyer, Aachen (DE); Dietrich Klakow, Saarbrücken (DE)

(73) Assignee: Nuance Communications Austria GmbH, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,972

(22) Filed: Sep. 14, 2012

(65) Prior Publication Data

US 2013/0066625 A1 Mar. 14, 2013

Related U.S. Application Data

(63) Continuation of application No. 13/210,214, filed on Aug. 15, 2011, now Pat. No. 8,332,221, which is a continuation of application No. 10/595,831, filed as application No. PCT/IB2004/052405 on Nov. 12, 2004, now Pat. No. 8,200,487.

(30) Foreign Application Priority Data

Nov. 21, 2003 (EP) .................................... 03104316

(51) Int. Cl.
 *G10L 15/00* (2013.01)
(52) U.S. Cl.
 USPC ........................................................ 704/236

(58) Field of Classification Search
 USPC .............................................. 704/236, 9, 10
 See application file for complete search history.

(56) References Cited

U.S. PATENT DOCUMENTS

| 4,477,698 | A | 10/1984 | Szlam et al. |
| 4,965,763 | A | 10/1990 | Zamora |

(Continued)

FOREIGN PATENT DOCUMENTS

| EP | 0 584 454 A1 | 3/1994 |
| JP | 06-083807 | 3/1994 |

(Continued)

OTHER PUBLICATIONS

Greffenstette, G., et al, "What is a word, What is a sentence? Problems of Tokenization," 3rd Conference on Computational Lexicography and Text Research. COMPLEX '94, Budapest, Jul. 7-10, 1994.

(Continued)

*Primary Examiner* — Michael N Opsasnick
(74) *Attorney, Agent, or Firm* — Wolf, Greenfield & Sacks, P.C.

(57) ABSTRACT

The invention relates to a method, a computer program product, a segmentation system and a user interface for structuring an unstructured text by making use of statistical models trained on annotated training data. The method performs text segmentation into text sections and assigns labels to text sections as section headings. The performed segmentation and assignment is provided to a user for general review. Additionally, alternative segmentations and label assignments are provided to the user being capable to select alternative segmentations and alternative labels as well as to enter a user defined segmentation and user defined label. In response to the modifications introduced by the user, a plurality of different actions are initiated incorporating the re-segmentation and re-labeling of successive parts of the document or the entire document.

20 Claims, 5 Drawing Sheets

(56) References Cited

U.S. PATENT DOCUMENTS

Figure 1:
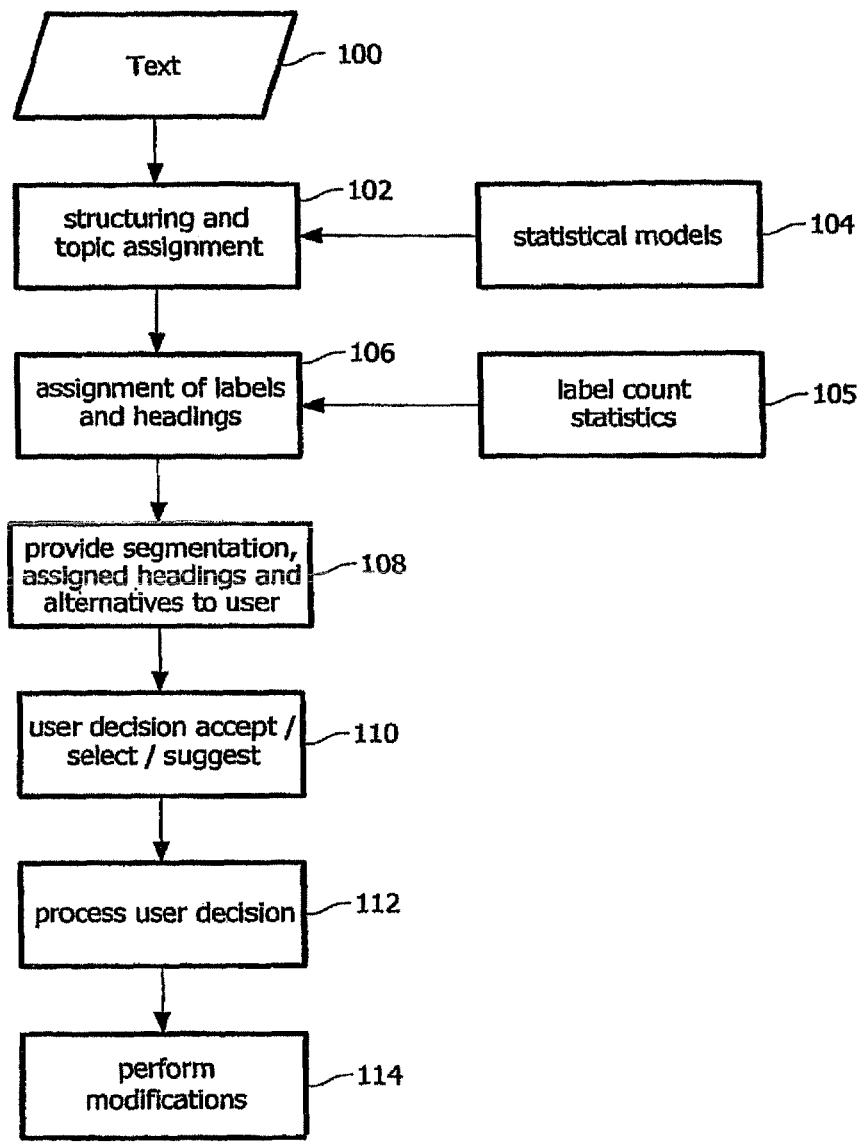

| | | | |
|---|---|---|---|
| 5,253,164 | A | 10/1993 | Holloway et al. |
| 5,325,293 | A | 6/1994 | Dorne |
| 5,327,341 | A | 7/1994 | Whalen et al. |
| 5,392,209 | A | 2/1995 | Eason et al. |
| 5,544,360 | A | 8/1996 | Lewak et al. |
| 5,664,109 | A | 9/1997 | Johnson et al. |
| 5,675,788 | A | 10/1997 | Husick et al. |
| 5,689,585 | A | 11/1997 | Bloomberg et al. |
| 5,799,268 | A | 8/1998 | Boguraev |
| 5,809,318 | A * | 9/1998 | Rivette et al. ............ 715/202 |
| 5,809,476 | A | 9/1998 | Ryan |
| 5,832,450 | A | 11/1998 | Myers et al. |
| 5,875,429 | A | 2/1999 | Douglas |
| 5,883,986 | A | 3/1999 | Kopec et al. |
| 5,915,254 | A | 6/1999 | Nakayama et al. |
| 5,924,068 | A | 7/1999 | Richard et al. |
| 5,950,214 | A * | 9/1999 | Rivette et al. ............ 715/202 |
| 5,970,463 | A | 10/1999 | Cave et al. |
| 5,974,412 | A | 10/1999 | Hazlehurst et al. |
| 5,991,780 | A * | 11/1999 | Rivette et al. ............ 715/255 |
| 6,006,221 | A | 12/1999 | Liddy et al. |
| 6,014,663 | A | 1/2000 | Rivette et al. |
| 6,021,202 | A | 2/2000 | Anderson et al. |
| 6,052,657 | A | 4/2000 | Yamron et al. |
| 6,052,693 | A | 4/2000 | Smith et al. |
| 6,055,494 | A | 4/2000 | Friedman |
| 6,088,437 | A | 7/2000 | Amick |
| 6,100,882 | A | 8/2000 | Sharman et al. |
| 6,108,629 | A | 8/2000 | Kasday |
| 6,182,029 | B1 | 1/2001 | Friedman |
| 6,192,112 | B1 | 2/2001 | Rapaport et al. |
| 6,199,079 | B1 | 3/2001 | Gupta et al. |
| 6,279,017 | B1 * | 8/2001 | Walker ............ 715/201 |
| 6,289,353 | B1 | 9/2001 | Hazlehurst et al. |
| 6,292,771 | B1 | 9/2001 | Haug et al. |
| 6,347,329 | B1 | 2/2002 | Evans |
| 6,360,215 | B1 | 3/2002 | Judd et al. |
| 6,405,165 | B1 | 6/2002 | Blum et al. |
| 6,434,547 | B1 | 8/2002 | Mishelevich et al. |
| 6,438,533 | B1 | 8/2002 | Spackman et al. |
| 6,499,041 | B1 | 12/2002 | Breslau et al. |
| 6,529,902 | B1 * | 3/2003 | Kanevsky et al. ............ 1/1 |
| 6,553,385 | B2 | 4/2003 | Johnson et al. |
| 6,556,987 | B1 | 4/2003 | Brown et al. |
| 6,684,188 | B1 | 1/2004 | Mitchell et al. |
| 6,789,060 | B1 | 9/2004 | Wolfe et al. |
| 6,865,258 | B1 | 3/2005 | Polcyn |
| 6,915,254 | B1 | 7/2005 | Heinze et al. |
| 6,947,936 | B1 | 9/2005 | Suermondt et al. |
| 7,124,144 | B2 | 10/2006 | Christianson et al. |
| 7,171,615 | B2 | 1/2007 | Jensen et al. |
| 7,206,998 | B2 | 4/2007 | Pennell et al. |
| 7,233,938 | B2 | 6/2007 | Carus et al. |
| 7,278,094 | B1 | 10/2007 | Dreyer et al. |
| 7,315,811 | B2 | 1/2008 | Cote et al. |
| 7,379,946 | B2 | 5/2008 | Carus et al. |
| 7,542,909 | B2 | 6/2009 | Cote |
| 7,774,196 | B2 | 8/2010 | Cote et al. |
| 7,783,474 | B2 | 8/2010 | Cote et al. |
| 7,822,598 | B2 | 10/2010 | Carus et al. |
| 7,860,717 | B2 | 12/2010 | Urhbach et al. |
| 7,958,443 | B2 | 6/2011 | Rosen et al. |
| 7,996,223 | B2 | 8/2011 | Frankel et al. |
| 8,024,176 | B2 | 9/2011 | Carus et al. |
| 8,069,411 | B2 | 11/2011 | Titemore et al. |
| 8,095,544 | B2 | 1/2012 | Boone et al. |
| 8,200,487 | B2 | 6/2012 | Peters et al. |
| 8,290,958 | B2 | 10/2012 | Boone et al. |
| 8,332,221 | B2 | 12/2012 | Peters et al. |
| 8,356,243 | B2 | 1/2013 | Rosen et al. |
| 8,504,369 | B1 | 8/2013 | Chigier et al. |
| 2002/0002459 | A1 | 1/2002 | Lewis et al. |
| 2002/0007285 | A1 | 1/2002 | Rappaport |
| 2002/0091713 | A1 * | 7/2002 | Walker ............ 707/200 |
| 2002/0095313 | A1 | 7/2002 | Haq |
| 2002/0099717 | A1 | 7/2002 | Bennett |
| 2002/0103826 | A1 | 8/2002 | Kriho et al. |
| 2002/0143818 | A1 | 10/2002 | Roberts et al. |
| 2002/0143824 | A1 | 10/2002 | Lee et al. |
| 2002/0169764 | A1 | 11/2002 | Kincaid et al. |
| 2002/0188452 | A1 | 12/2002 | Howes |
| 2003/0018668 | A1 * | 1/2003 | Britton et al. ............ 707/513 |
| 2003/0046264 | A1 | 3/2003 | Kauffman |
| 2003/0061201 | A1 | 3/2003 | Grefenstette et al. |
| 2003/0109936 | A1 | 6/2003 | Umen et al. |
| 2003/0115080 | A1 | 6/2003 | Kasravi et al. |
| 2003/0145282 | A1 * | 7/2003 | Thomas et al. ............ 715/513 |
| 2003/0154080 | A1 | 8/2003 | Godsey et al. |
| 2003/0208382 | A1 | 11/2003 | Westfall |
| 2003/0233344 | A1 | 12/2003 | Kuno et al. |
| 2003/0233345 | A1 | 12/2003 | Perisic et al. |
| 2004/0103075 | A1 | 5/2004 | Kim et al. |
| 2004/0111265 | A1 | 6/2004 | Forbes |
| 2004/0139400 | A1 | 7/2004 | Allam et al. |
| 2004/0186746 | A1 | 9/2004 | Angst et al. |
| 2004/0220895 | A1 | 11/2004 | Carus et al. |
| 2004/0243545 | A1 | 12/2004 | Boone et al. |
| 2004/0243551 | A1 | 12/2004 | Boone et al. |
| 2004/0243552 | A1 | 12/2004 | Titemore et al. |
| 2004/0243614 | A1 | 12/2004 | Boone et al. |
| 2004/0255239 | A1 | 12/2004 | Bhatt et al. |
| 2005/0039033 | A1 | 2/2005 | Meyers et al. |
| 2005/0108010 | A1 | 5/2005 | Frankel et al. |
| 2005/0114122 | A1 | 5/2005 | Uhrbach et al. |
| 2005/0120020 | A1 | 6/2005 | Carus et al. |
| 2005/0120300 | A1 | 6/2005 | Schwager et al. |
| 2005/0144184 | A1 | 6/2005 | Carus et al. |
| 2005/0165598 | A1 | 7/2005 | Cote et al. |
| 2005/0165602 | A1 | 7/2005 | Cote et al. |
| 2005/0183006 | A1 | 8/2005 | Rivers-Moore et al. |
| 2005/0192792 | A1 | 9/2005 | Carus et al. |
| 2005/0192793 | A1 | 9/2005 | Cote et al. |
| 2005/0198563 | A1 | 9/2005 | Kristjansson |
| 2005/0207541 | A1 | 9/2005 | Cote |
| 2005/0228815 | A1 | 10/2005 | Carus et al. |
| 2006/0075337 | A1 | 4/2006 | Jones et al. |
| 2011/0231753 | A1 | 9/2011 | Rosen |
| 2012/0095751 | A1 | 4/2012 | Peters et al. |
| 2013/0111331 | A1 | 5/2013 | Rosen et al. |

FOREIGN PATENT DOCUMENTS

| | | |
|---|---|---|
| JP | 2000-200273 | 7/2000 |
| WO | WO 95/30201 A1 | 11/1995 |

OTHER PUBLICATIONS

Hirschman, L., The Roles of Language Processing in a Spoken Language Interface, *Voice Communication Between Humans and Machines*, National Academy of Sciences, 1994, pp. 217-237; http://www.pnas.org/cgi/reprint/92/22/9970.

Kupiec, J., Probabilistic Models of Short and Long Distance Word Dependencies in Running Text, Proceedings of DARPA Speech and Natural Language Workshop, 1992, pp. 290-295; http://acl.ldc.upenn.edu/H/H89/H89-1054.pdf.

Maltese, G., et al., An Automatic Technique to Include Grammatical and Morphological Information in a Trigram-Based Statistical Language Model, *IEEE International Conference on Acoustics, Speech, and Signal Processing*, 1992, pp. 157-160.

Mikheev, A., "Tagging sentence boundaries." *In NACL '2000* (Seattle), ACL Apr. 2000: 264-271.

Moore, R. C., Integration of Speech with Natural Language Processing, *Voice Communication Between Humans and Machines*, National Academy of Sciences, 1994, pp. 254-271; http//www.pnas.org/cgi/reprint/92/22/9983.

Murveit, H., et al., Integrating Natural Language Constraints into HMM-Based Speech Recognition, IEEE, 1990, pp. 573-576.

Norton, L., et al., Recent Improvements and Benchmark Results for the Paramax ATIS System, *Proceedings of DARPA Workshop on Speech and Natural Language*, 1992; http://acl.ldc.upenn.edu/H/H92/H92-1017.pdf.

(56) References Cited

OTHER PUBLICATIONS

Ostendorf, M., et al., Integration of Diverse Recognition Methodologies through Reevaluation of N-Best Sentence Hypotheses, *Proceedings of DARPA and Natural Language Workshop*, 1991; http://acl.ldc.upenn.edu/H/H91/H91-1013.pdf.

Palmer, D.D., et al., "Adaptive multilingual sentence boundary disambiguation," Computational Linguistics 23(2),1997.

Rayner, M. et al.., Combining Knowledge Sources to Reorder N-Best Speech Hypothesis List, *Proceedings DARPA Speech and Natural Language Workshop*, 1994; http://acl.ldc.upenn.edu/H/H94/H94-1040.pdf.

Reynar, J.C., et al., "A Maximum Entropy Approach to Identifying Sentence Boundaries." In Proceedings of the Fifth Conference on Applied Natural Language Processing, Washington D.C., 1997: 16-19.

Ringger, E. K.. et al., Error Correction via a Post-Processor for Continuous Speech Recognition, *In Proc. of ICASSP-96*, IEEE-96, 1996.

Schmid, H., "Unsupervised Learning of Period Disambiguation for Tokenisation." Internal Report, IMS, University of Stuttgart, May 2000.

Schwartz, R., et al., On Using Written Language Training Data for Spoken Language Modelling, *Proceedings of Human Language Technology Workshop*, Morhan Kaufmann Publishers, Inc., 1994, pp. 94-98; http://acl.ldc.upenn.edu/H/H94/H94-1016.pdf.

Sproat, R., "Multilingual Text Analysis for Text-to-Speech Synthesis," ECAI Workshop on Extended Finite-State Models of Language, Aug. 1996.

Sproat, R., et al., "Normalization of Non-standard Words," Computer Speech and Language 15(3) 2001: 287-333.

Strzalkowski, T. et al., A Natural Language Correction Model for Continuous Speech Recognition, *Proceedings of the Fifth Workshop on Very Large Corpora*, pp. 168-177, Aug. 1997; http://acl.ldc.upenn.cdu/W/W97/W97-0117.pdf.

Yarovvsky, D., "Homograph Disambiguation in Text-to-Speech Synthesis." In J. van Santen, R. Sproat, J. Olive and J. Hirschberg (eds.), Progress in Speech Synthesis. Springer-Verlag, 1996: 159-175.

Yarowsky, D., "A Comparison of Corpus-based Techniques for Restoring Accents in Spanish and French Text." In Proceedings, 2nd Annual Workshop on Very Large Corpora. Kyoto, 1994: 19-32.

Yarowsky, D., "Decision Lists for Lexical Ambiguity Resolution: Application to Accent Restoration in Spanish and French." In Proceedings of the 32nd Annual Meeting of the Association for Computational Linguistics, Las Cruces, NM, 1994: 88-95.

Japanese Office Action from Japanese Application No. JP 2006-540706 dated Jul. 8, 2010.

Japanese Office Action from Japanese Application No. JP 2011-103843 dated Nov. 22, 2012.

Japanese Office Action from Japanese Application No. JP 2011-170125 dated Dec. 14, 2012.

Yagi, Reiko, "Looming Next MS Office, Featuring Information Sharing with XML," Nikkei BYTE, No. 240, Japan, Nikkei BP, pp. 14-15, Apr. 22, 2003.

Yagi, Reiko, "Way to Survive for Package Software," Nikkei BYTE, No. 238 Japan, Nikkei BP, pp. 84-85, Feb. 22, 2003.

Japanese Office Action from Japanese Application No. JP 2006-540706 dated Jan. 11, 2011.

Japanese Office Action from Japanese Application No. JP 2011-103843 dated Jul. 9, 2013.

Japanese Office Action from Japanese Application No. JP 2011-170125 dated Jul. 9, 2013.

International Search Report and Written Opinion for PCT/IB2004/052405 mailed Feb. 3, 2006.

International Preliminary Report on Patentability for PCT/IB2004/052405 dated Jul. 20, 2006.

Canadian Office Action from Canadian Application No. 2614233 dated Mar. 12, 2010.

Extended European Search Report from European Application No. 06786051.0, dated Jul. 8, 2010.

International Search Report and Written Opinion for PCT/US2006/025718 mailed Oct. 23, 2007.

International Preliminary Report on Patentability for PCT/US2006/025718 mailed May 24, 2011.

Canadian Office Action from Canadian Application No. 2523997 dated Aug. 4, 2010.

Extended European Search Report from European Application EP 04753663.6, dated Jan. 4, 2008.

Examination Report from European Application EP 04753663.6, dated Jul. 20, 2007.

Examination Report from European Application EP 04753663.6 dated Jun. 17, 2011.

Extended European Search Report from European Application EP 12177400.4, dated Jan. 4, 2013.

Extended European Search Report from European Application EP 12177400.4, dated Mar. 7, 2013.

International Search Report and Written Opinion for PCT/US2004/016878 mailed Mar. 9, 2005.

International Preliminary Report on Patentability for PCT/US2004/016878 mailed Dec. 15, 2005.

[No Author Listed] Case Study: Massachusetts Medical Society http://www.microsoft.com/resources/casestudies/CaseStudy.asp?CaseStudyID=14931 posted Jan. 13, 2004.

[No Author Listed] Category III CPT Codes, American Medical Association, http://wvvw.ama-assn.org/ama/pub/article/3885-4897.html printed Mar. 22, 2004.

[No Author Listed] ICD-9-CM Preface (FY04), http://ftp.cdc.dov/pub/HealthStatistics/NCHS/Publications/ICD9-CM/2004/Prefac05.RTF.

[No Author Listed] Code Information and Education web page, American Medical Association, http://www.ama-assn.org/ama/pub/category/3884.html ptinted Mar. 22, 2004.

[No Author Listed] Continuity of Care Record (CCR), AAFP Center for Health Information Technology, http://www.centerforhit.orq/x201.xml posted Aug. 20, 2004.

[No Author Listed] Continuity of Care Record (CCR): The Concept Paper of the CCR, v.2.1b, http://www.bhtinfo.com/CCR.Concept%20Paper.1.5.doc.

[No Author Listed] Continuity of Care Record, American Academy of Family Physicians, http://www.aafp.org/x24962.xml?printxml posted Nov. 12, 2003.

[No Author Listed] Core Measures web page, Joint Commission on Accreditation of Healthcare Organizations, http://www.jcaho.org/pms/core+measures/ printed Mar. 22, 2004.

[No Author Listed] Customizing D/41 Call Analysis, date unknown, Intel Corp., Santa Clara, California, available at http://resource.intel.com/telecom/support/appnotes/custd41d.htm (last accessed Jul. 25, 2005).

[No Author Listed] Epic Web Training Manual, pp. 1-33, 2002.

[No Author Listed] Hardware Reference Manual, Release 3 for DOS, revised Jan. 1994, P1KA Technologies, Inc., Ontario, Canada, available at htto://www.pikatechnolopies.com/downloads/leoacy/AVA%20BSeries%20Hardware%20Manual.pdf (last 'accessed Jul. 25, 2005).

[No Author Listed] ICD-9-CM Official Guidelines for Coding and Reporting, effective Oct. 1, 2003.

[No Author Listed] Press Release: Kryptiq Announces Support of CCR Initiative and Introduces New Solutions that Enable Information Portability, Accessibility and Clinical System Interoperability, http://www.kryptiq.com/News/PressReleases/27.html posted Feb. 17, 2004.

[No Author Listed] Specifications Manual for National Implementation of Hospital Core Measures, v. 2.0, Joint Commission on Accreditation of Healthcare Organizations, http://www.jcaho.orq/pms/core+measures/information+on+final+specifications.htm.

[No Author Listed] Stemming Errors. http://www.comp.lancs.ac.uk/computing/research/stemming/general/stemmingerrors.htm printed Jul. 19, 2004.

[No Author Listed] Stemming Peformance. http://www.comp.lancs.ac.uk/computing/research/stemming/general/performance.htm printed Jul. 19, 2004.

(56) References Cited

OTHER PUBLICATIONS

[No Author Listed] What is Stemming? http://www.comp.lancs.ac.uk/comnuting/researchistemming/general/index.htm printed Jul. 19, 2004.

[No Author Listed] Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.

Braithwaite, Continuity of Care Record (CCR) http://www.hl7.org/library/himss/2004Orlando/ContinuityofCareRecord,pdf.

Brill, Some Advances in Transformation-Based Part of Speech Tagging, Spoken Language Systems Group. MIT, 1994, proceedings of AAAI94.

Creutz, Morphology and Finite-State Transducers, Oct. 31, 2001, Chap 3, Jurafsky & Martin.

Cutting et al., A Practical Part-of-Speech Tagger, Xerox Palo Alto Research Center, 1992.

Daelemans et al., TIMBL: Tilburg Memory Based Learner, version 5.0, Reference Guide, ILK Research Group Technical Report Series No. 04-02 (ILK-0402), ILK Research Group, Tilburg University, Tilburg, Netherlands, 2004.

Day, Extracting Knowledge from Text Using Learning by Constraint Relaxation (LCR), CSI, www.csi-inc.com/CSI/pdf/iday icim02.pdf, 2002.

Gale et al., Discrimination Decisions for 100,000-Dimensional Spaces, Current Issues in Computational Linguistics, pp. 429-450, Kluwer Academic Publishers, 1994.

Hearst, Multi-paragraph segmentation of expository text. Annual Meeting of the Association for Computational Linguistics. Proceedings of the Conference. Arlington, VA. Jun. 26, 1994:9-16.

Heinonen, Optimal Multi-Paragraph Text Segmentation by Dynamic Programming. Proceedings of the International Conference on Computational Linguistics. 1998;P98:1484-86.

Hieb, Research Note, NLP Basics for Healthcare, Aug. 16, 2002.

Lee et al., Cleansing Data for Mining and Warehousing, Lecture Notes in Computer Science vol. 1677 archive, Proceedings of the le International Conference on Database and Expert Systems Applications, pp. 751-760, Springer-Verlag, London, 1999.

McGregor et al. "The e-baby data warehouse: a case study" System Sciences, 2001. HICSS. Proceedings of the 35th Annual Hawaii International Conference on Jan. 7-10, 2001, Piscataway, NJ, USA, IEEE, Los Alamitos CA, pp. 2871-2877, 2001.

McLaughlin, Java & XML. Second Edition, Japan, O'Reilly, May 25, 2002, IBBN: 4-87311-082-3, xv, p. 10. Japanese.

Nevill-Manning et al., The Development of Holte's 1R Classifier, Department of Computer Science. University of Waikato, New Zealand, 1995, pp. 1-5 , ISSN 1170-487X.

Nivre, DAC723: Language Technology Finite State Morphology, Vaxjo University of Mathematics and Systems Engineering, p. 1/11, 2001.

Ponte et al., Text segmentation by topic. Research and Advanced Technology for Digital Libraries. European Conference, ECDL Proceedings. Sep. 1, 1997:113-125.

Shalizi et al., Pattern Discovery in Time Series, Part I: Theory, Algorithm, Analysis, and Convergence, Journal of Machine Learning Research (2002) Submitted Oct. 28, 2002; Published 2002.

Smith et al., "MICROARRAS: An Advanced Full-Text Retrieval and Analysis System," Proceedings of the Tenth Annual International ACMSIGIR Conference on Research & Development in Information Retrieval, ACM 1987, pp. 187-195.

Song et al., A Cognitive Model for the Implementation of Medical Problem Lists, Proceedings of the First Congress on Computational Medicine, Public Health and Biotechnology, Austin, Texas, 1994.

Song et al., A Graphical Interface to a Semantic Medical Information System, Journal of Foundations of Computing and Decision Sciences, 22(2), 1997.

Song et al., A Graphical Interface to a Semantic Medical Information System, Karp-95 Proceedings of the Second International Symposium on Knowledge Acquisition, Representation and Processing, pp. 107-109, 1995.

Van Mulbregt et al., Text segmentation with multiple surface linguistic cues. Proceedings of the 36th Annual Meeting on Association for Computational Linguistics. Montreal, Quebec. 1998;2:881-85.

Van Rijsbergen, Search Strategies. Information Retrieval, 2nd Ed., Ch. 5, Butterworths, London, 1979.

Waegemann, EHR vs. CCR: What is the difference between the electronic health record and the continuity of care record?, Medical Records Institute, 2004.

Yang et al., "Faster algorithm of string comparison," Pattern Analysis and Applications, vol. 6, No. 1, Apr. 2003: pp. 122-133.

Zavrel et al., Recent Advances in Memory-Based Part-of-Speech Tagging, ILK/Computational Linguistics. Tilburg University, The Netherlands, 1999, pp 590-597.

* cited by examiner

TEXT SEGMENTATION AND LABEL ASSIGNMENT WITH USER INTERACTION BY MEANS OF TOPIC SPECIFIC LANGUAGE MODELS AND TOPIC-SPECIFIC LABEL STATISTICS

RELATED APPLICATIONS

This application is a Continuation of U.S. patent application Ser. No. 13/210,214, filed on Aug. 15, 2011, issued on Dec. 11, 2012 as U.S. Pat. No. 8,332,221, which is a Continuation of U.S. patent application Ser. No. 10/595,831, filed on Mar. 2, 2007, issued on Jun. 12, 2012 as U.S. Pat. No. 8,200,487, which is a National Stage Application of PCT/IB2004/052405, filed on Nov. 12, 2004, which claims the benefit of European Patent Application No. 03104316.9 filed on Nov. 21, 2003, each of which is incorporated herein by reference in its entirety.

The present invention relates to the field of generating structured documents from unstructured text by segmenting unstructured text into text sections and assigning a label to each section as section heading. The text segmentation as well as the assignment of labels to text sections also denoted as labelling is provided to a user having control of the segmentation and the labelling procedure.

Text documents that are generated by a speech to text transcription process usually do not provide any structure since conventional speech to text transcription systems or speech recognition systems only literally transcribe the recorded speech into corresponding text. Explicitly dictated commands of text formatting, text highlighting, punctuation or text headings have to be properly recognized and processed by the speech recognition system or by a text formatting procedure being successively applied to the text generated by the speech recognition process.

Both automatic speech recognition as well as automatic text formatting systems that are typically based on training data and/or manually designed text formatting rules inevitably produce errors because of a lack of human expertise which is needed to properly identify complex formatting commands, section boundaries as well as distinct text portions, e.g. representing a section heading. The result of an ordinary speech to text transcription process or text formatting process therefore has to be provided to a human proof reader. The proof reader has to browse through the entire document thereby gathering information about the content of the document and to decide whether the speech to text transcription process produced reasonable results and whether a text formatting has been performed correctly with respect to the content of the document.

The task of the proof reader even aggravates when the structure of a document is not explicitly dictated, i.e. many headings and section boundaries are not explicitly encoded in the spoken dictation. Furthermore, when even sentence structures, i.e. punctuation symbols, are rarely dictated, these punctuation symbols have to be manually inserted by the proof reader.

Especially the partitioning of a text into sections is a rather demanding task for a proof reader because the detection of a change of a section type cannot be decided before a longer part of the new section has been read by the proof reader. Here the proof reader has to jump back to some position in the already examined text in order to insert a section boundary and an appropriate heading. In particular the permanent jumping between different positions in the document is very time consuming and exhausting for the human proof reader.

The present invention aims to provide a method, a computer program product, a text segmentation system as well as a user interface for a text segmentation system in order to perform a segmentation and labelling of an unstructured text in response to a user's decision.

The present invention provides an efficient user interface for a text processing system which employs a method of segmentation of a text into text sections, of assigning a topic to each section, and of assigning a label in form of a section heading to each text section. These tasks are performed using statistical models which are trained on the basis of annotated training data. First, the method performs a segmentation of the text into text sections by making use of the statistical models extracted from the training data. After the text has been segmented into text sections, each text section is assigned with a topic being indicative of the content of the text section. The assignment of the topic to a text section makes also use of the statistical models extracted from the training data. After the text segmentation and the topic assignment has been performed, a structured text is generated by inserting a label as a section heading into the text. The label is inserted in the text at a position corresponding to a section border in such a way that the label is directly followed by the section it refers to. This inserted label is to be understood as a heading which precedes the following text section.

When the structured text has been generated in the above described way, the structured text is provided to a user having control of the segmentation, the topic assignment and the general structuring of the text. The method finally performs modifications of the structured text in response to the user's review.

According to a preferred embodiment of the invention, the insertion of labels as section headings comprises a text formatting procedure incorporating formatting steps such as punctuating, highlighting, indenting and modifying the type face.

According to a further preferred embodiment of the invention, the topic assignment to a text section also comprises the assignment of a set of labels to the text section. One label of the set of assigned labels is finally inserted as a section heading into the text. Here, a topic represents a rather abstract declaration of a distinct class or type of section. Such a declaration is particularly applicable to so-called organized documents following a typical or predefined structure. For example a medical report features a topic sequence like demographic header, patient history, physical examination and medication.

Each section of such a structured document can be identified by an abstract topic. In contrast to the abstract topic, a label is indicative of a concrete heading of such a section. For example the section referring to an examination of the patient can be labelled in a plurality of different ways, such as "physical examination", "examination", "exam", "surgical examination". No matter how a section of text is labelled, the content of the section, i.e. in this case an examination, is identified by the assigned topic.

The segmentation of the text into text sections can for example be performed by a method disclosed in U.S. Pat. No. 6,052,657 making use of language models and language model scores in order to indicate a correlation between a block of text and a language model. A more accurate and reliable procedure for text segmentation and topic assignment is disclosed in the patent application "text segmentation and topic annotation for document structuring" filed by the same applicant herewith concurrently. This document describes a statistical model for text segmentation and topic annotation by making explicit use of a topic sequence probability, a topic position probability, a section length probability as well as a text emission probability. These probabilities are especially helpful when the underlying annotated training data refer to organized documents.

According to a further preferred embodiment of the invention, the assignment of one label of the set of labels to a text section, and inserting the one assigned label as a section heading of the text section into the text, accounts for count statistics based on the training data and/or explicit or partial verbalizations found at the beginning of a section. The count statistics reflects the observed frequency that a section assigned to some topic is preceded by a specific label. In this way, the most frequently assigned label per topic may be selected as a default heading if no other hints about the most suitable label or heading are found in the text. In other words by means of a count statistic a default label is assigned to a text section.

Alternatively, the label assignment based on the count statistic is overruled when an explicit verbalization is found at the beginning of a section exactly matching one of the set of labels being assigned to the section. Furthermore, if no label matches exactly with an explicit verbalization found at the beginning of a section, then a label matching only partially some verbalization found at the beginning of the section may be inserted instead of the default label. The assignment of one label to a text section, i.e. the selection of one label of the set of labels being assigned to the text section, can also be performed with respect to the count statistics based on the training data in combination with explicit full or partial verbalizations found at the beginning of a section.

According to a further preferred embodiment of the invention, if some full or partial verbalization is found at the beginning of the section, this verbalization may be removed from the section. This is useful, if the verbalization represents an explicitly dictated heading which is replaced by the inserted label. As an example, a section starting with "medications the patient takes . . . " can be assigned to the label "medications". Since this label serves as a heading for the subsequent section, the term "medications" itself should be removed from the text of the section leaving the proper content of the section starting with "the patient takes . . . ". Modifications of this strategy include the removal of some predefined filler words which may be part of the dictated heading or initial phrase of some section, even if these filler words are not part of the label, e.g. if some section starts with "medications are X, Y, Z, . . . " which is converted into the heading "medications" followed by the list of medications "X, Y, Z, . . . " where the filler word "are" is skipped.

According to a further preferred embodiment of the invention, the insertion of a section heading into the text e.g. due to an exact matching between an explicit verbalization and a label can be overruled by the user. In this case, the insertion is reversed by the method and the original text portion is restored. More specifically, if some section-initial words have been removed due to a match with the assigned label, these words have to be re-inserted when the user decides for a different label which does not match these removed words.

According to a further preferred embodiment of the invention, the providing of the structured text to a user further comprises providing of the complete set of labels being assigned to each text section. Since each label of the set of labels represents an alternative for the section heading, the user can easily compare the automatically inserted section heading with alternative headings.

According to a further preferred embodiment of the invention, the providing of the structured text to a user further comprises providing indications of alternative section borders. In this way not only the section borders automatically inserted into the text by the present method are visible to the user, but also alternative section borders are provided to the user for an easier and facilitated proof reading. In this way the proof reader's task to find the correct section borders of the document is reduced to the retrieval of automatically inserted section borders and alternative section borders.

According to a further preferred embodiment of the invention, modifications of the structured text in response to the user's review refer to the modification of the segmentation of the text into text sections and/or modifications of the assignment between labels and text sections. Furthermore modifications of performed formatting such as punctuation, highlighting and the like are also conceivable.

According to a further preferred embodiment of the invention, modifications of the text segmentation and modifications of the assignment of labels to text sections performed in response to the user's review are initiated by the user selecting one of the provided labels or one of the alternative section borders. The modification selected by the user is then performed by the present method, replacing a section heading by a selected section heading, or shifting a section border.

Accomplishing a first text modification may imply that a second text modification has to be performed. For example when the section headings are enumerated, the removal of a text section requires a re-enumeration of the successive text sections or section labels. Therefore, the present invention is further adapted to dynamically perform modifications that are due to a prior modification performed in response to the user's review.

According to a further preferred embodiment of the invention, a modification of the assignment of a label to a text section as a section heading is performed in response of the user either selecting one label of the provided set of labels being assigned to the text section or by entering a user defined label and assigning this user defined label as section heading to the text section. In this way the user can quickly and effectively identify one label of the provided set of labels as the correct section heading or alternatively define a previously unknown heading to the relevant text section.

The selection of one label of a set of a labels as well as the entering of a label is not restricted to positions in the text that were identified as section borders but moreover an appropriate set of labels can be provided at any position in the text upon user request. In this way the user still has complete control of structuring and labelling the document.

According to a further preferred embodiment of the invention, the processing of modifications in response to the user's review successively triggers a re-segmentation of the text into text sections and a regeneration of a structured text by inserting labels as section headings referring to text sections. Both the re-segmentation as well as the regeneration of the structured text make use of the statistical models extracted from the training data and make reference to already performed modifications that were processed in response to the user's review. When for example a user has introduced a modification in the text either in the form of a redefinition of a section border or in the form of re-labelling a section heading, the method of the present invention performs a successive re-segmentation and regeneration of the structured text by leaving the initially performed modifications of the user unaltered. In this way modifications introduced by the user are never overruled or re-modified by the inventive method.

According to a further preferred embodiment of the invention, the re-segmentation of the text into sections as well as the regeneration of the structured text by inserting labels as section headings is performed dynamically during a review process performed by the proof reader or user. The re-segmentation of the text as well as the regeneration of the structured text can either be applied to all text sections, to the current and all following sections, or to a single section if specified by the user. For example when a new section boundary is introduced or when a heading is removed by the user, it is reasonable that a further restructuring or heading update is restricted to the current section only. In this way the method can faster respond to small, hence local changes that have to be introduced into the text.

According to a further preferred embodiment of the invention, the granularity of the text segmentation can be controlled by the user by customizing a so-called granularity parameter. In this way the user can determine whether the text is structured in a finer or coarser way. A change of the customizable granularity parameter results into removal or insertion of text sections.

According to a further preferred embodiment of the invention, modifications that are performed in response to the user's review are logged and analyzed by the present method in order to further train the statistical models. In this way the entire method can effectively be adapted to the user's preferences. When for example a distinct label has been repeatedly removed from the text by the user, the method of text segmentation restrains to insert this distinct section heading in future applications. The impact of the user's modification on the adaptation of the method—hence the sensitivity of the adaptation—may be also controlled by the user. This means that for example an insertion or a removal of a label has to occur several predefined times before the method adapts to this particular user introduced modification. The number of how often a change has to manually inserted until the method adapts to the introduced change may be given by the user.

Furthermore, the adaptation of the method towards user introduced modifications can already refer to successive sections in the present document. The method adapts to modifications introduced by the user in the beginning part of a document and automatically performs corresponding modifications within successive text sections. The adaptation therefore applies to a present document as well as to future documents to which the inventive method is applied to.

Figure 2:
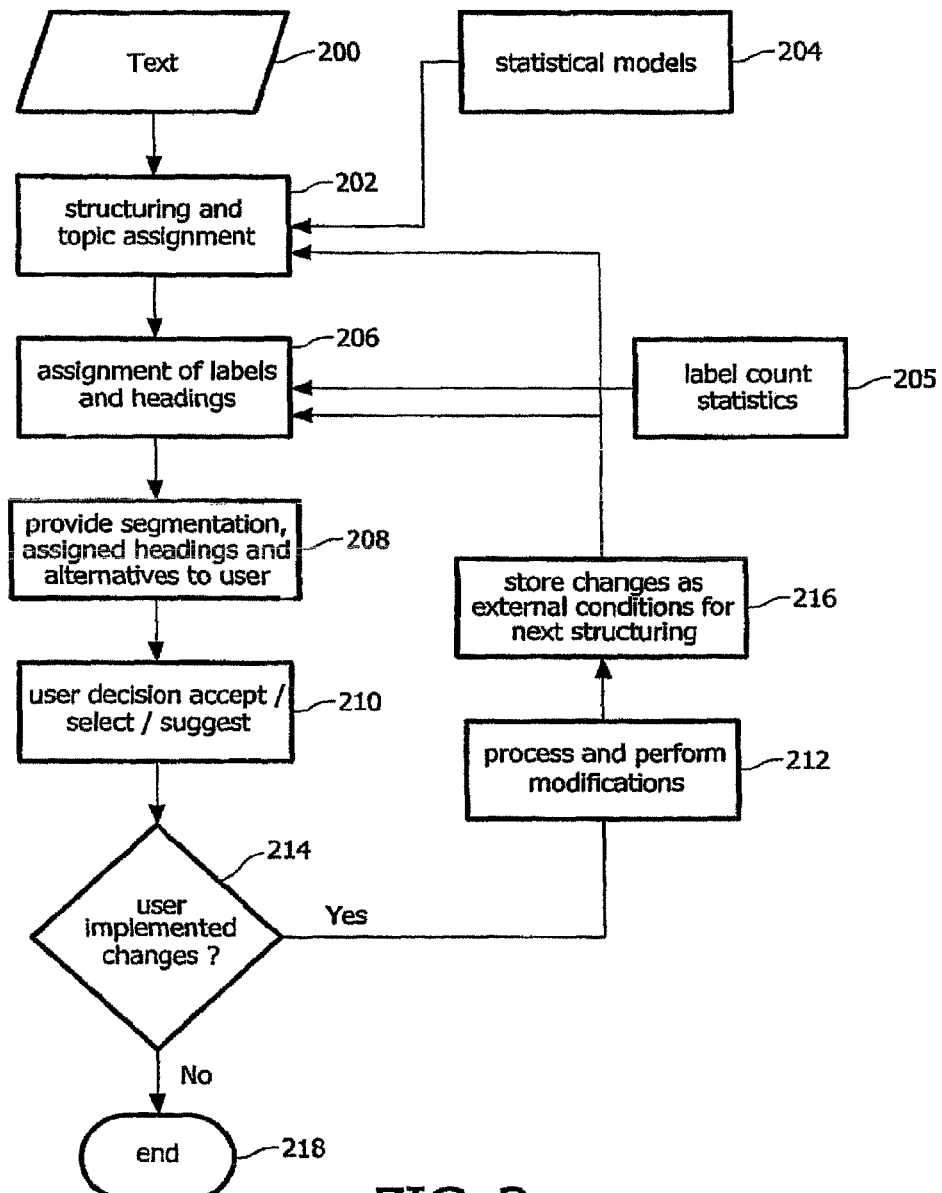
Figure 3:
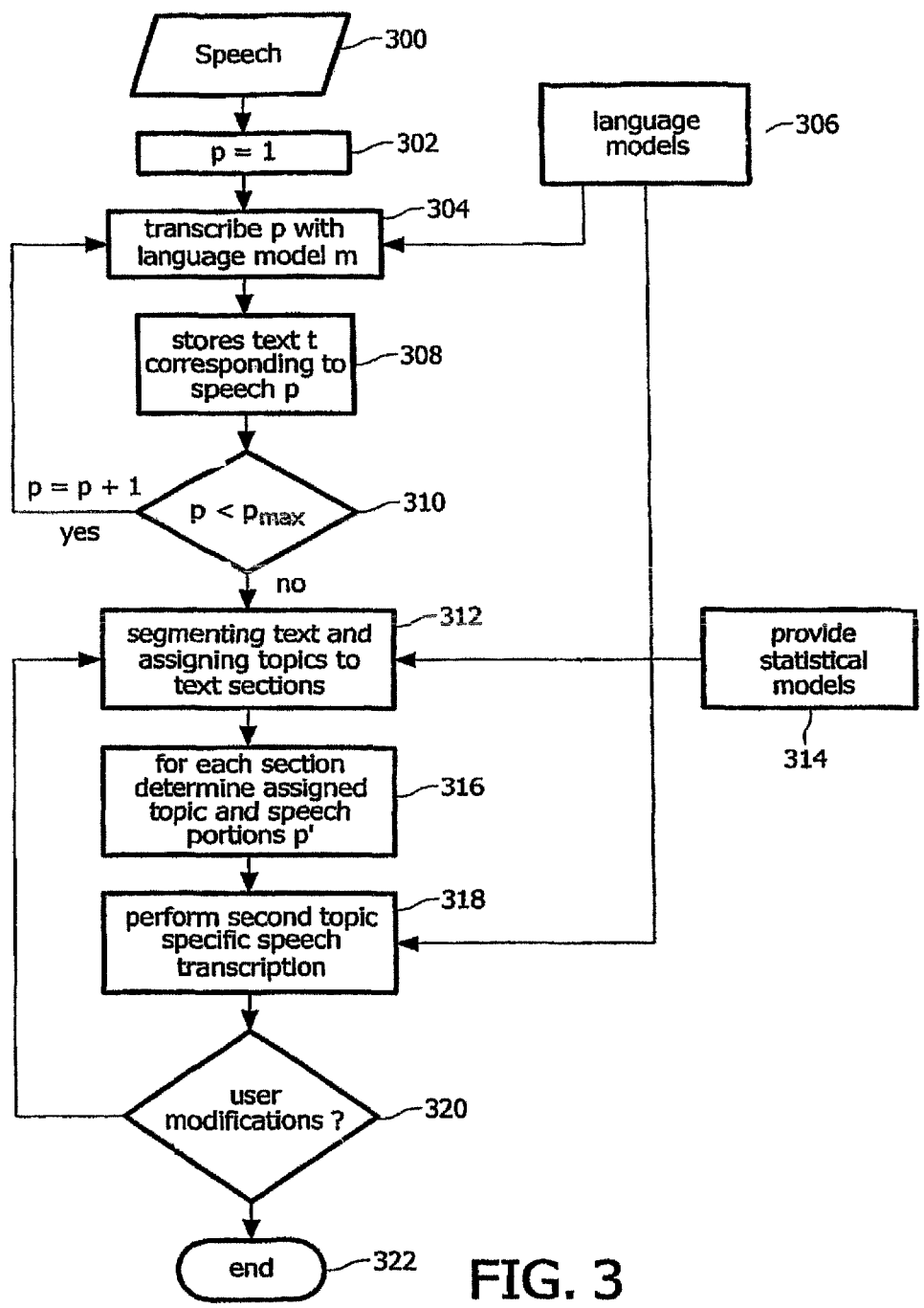
Figure 4:
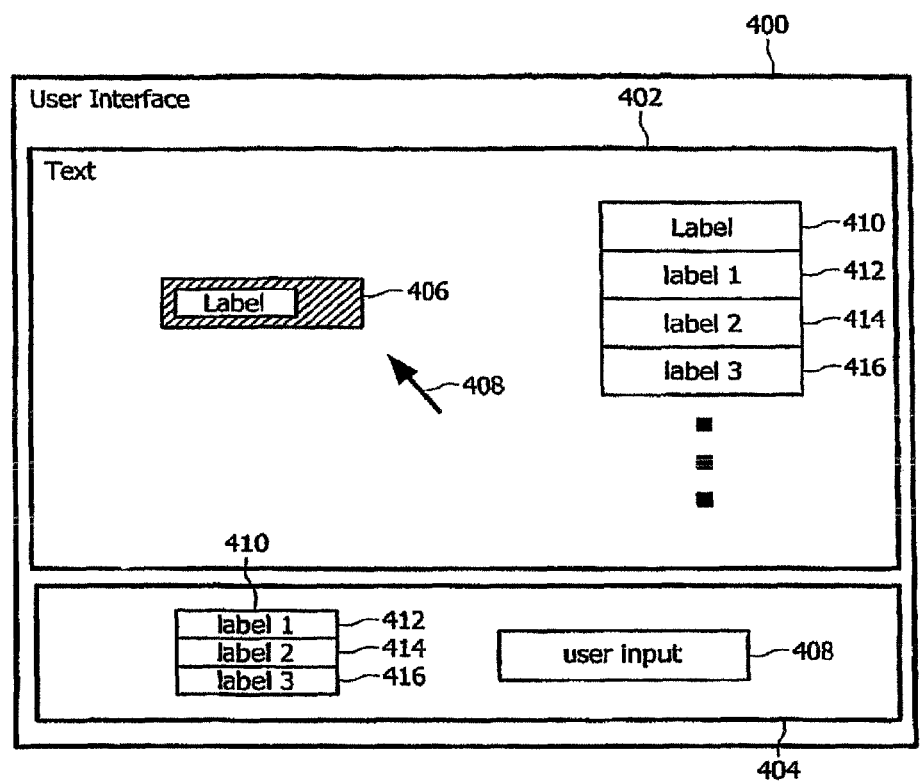
Figure 5:
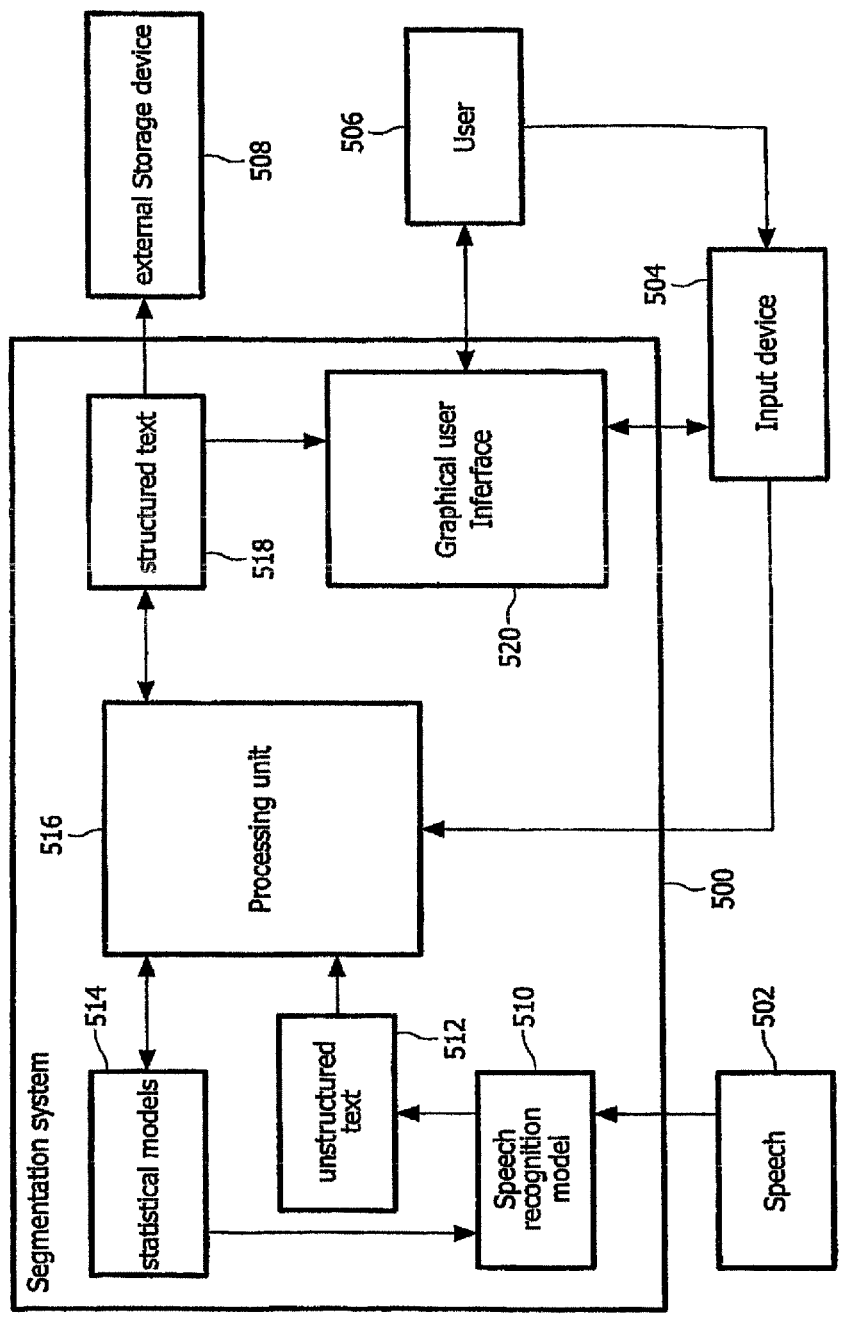

In the following, preferred embodiments of the invention will be described in greater detail by making reference to the drawings in which:

FIG. 1 illustrates a flow chart of the segmentation method of the present invention, FIG. 2 illustrates a flow chart for text segmentation incorporating analyzation of user introduced modifications, FIG. 3 illustrates a flow chart of an implementation of the present invention into a speech recognition process, FIG. 4 shows a block diagram of the user interface of the present invention, FIG. 5 shows a block diagram of the segmentation system.

The invention relates to a method, a computer program product, a segmentation system and a user interface for structuring an unstructured text by making use of statistical models trained on annotated training data. The method performs text segmentation into text sections and assigns labels to text sections as section headings. The performed segmentation and assignment is provided to a user for general review. Additionally, alternative segmentations and label assignments are provided to the user being capable to select alternative segmentations and alternative labels as well as to enter a user defined segmentation and user defined label. In response to the modifications introduced by the user, a plurality of different actions are initiated incorporating the re-segmentation and re-labeling of successive parts of the document or the entire document. Furthermore the method comprises a learning functionality, logging and analyzing user introduced modifications for adaptation of the method to the user's preferences and for further training of the statistical models.

FIG. 1 illustrates a flow chart of the text segmentation and topic assigning method. In the first step 100 an unstructured text generated e.g. by a speech to text transcription system is inputted. Based on the inputted text, in step 102 the method performs a structuring and topic assignment of the text by segmenting the text into text sections and assigning a topic to each text section. In order to perform the text segmentation and topic assignment in step 102, language or statistical models being extracted from training data are provided to step 102 by step 104. Step 105 provides a label count statistics indicating the probability that a label is assigned to a topic. Based on the training data, the label count statistics reflects how often a label is assigned to a topic.

In step 106 a label is assigned to each text section as a section heading and inserted at the appropriate position into the text by making reference to the count statistics provided by step 105 and the segmented text provided by step 102. After the label assignment has been performed by step 106 the segmented text and the inserted labels as well as alternative labels are provided to a user in step 108. Furthermore alternative section boundaries are provided to the user in step 108. In the successive step 110 the user decides whether the provided segmentation and label assignment of step 108 is acceptable. Alternatively the user can select alternative headings provided by step 108 or alternative segmentations provided by alternative section boundaries.

If none of the provided alternatives satisfies the user's preferences, the user can also enter a section boundary as well as a section heading. In response to the user's decision of step 110, the user's decision is processed by the method in step 112. Processing of the user's decision comprises replacing inserted section headings, re-labelling successive section headings, restructuring successive or part of the document or restructuring and re-labelling the entire document. Furthermore a dynamical processing of user introduced modifications is also conceivable. Dynamic processing means, that a user introduced modification automatically triggers further modifications that are related to proceeding text sections or modifications to be performed during a successive application of the structuring method.

After the user decision has been processed in step 112 the resulting modifications are performed in the following step 114.

FIG. 2 is illustrative of a flow chart of the text segmentation and text assignment method incorporating analyzation of user introduced modifications. In a first step 200 an unstructured text resulting from e.g. a speech to text transcription process, is provided to step 202. In step 202 a text segmentation into text sections is performed by making use of language or statistical models provided by step 204. Furthermore in step 202 a topic is assigned to each text section by making use of the statistical information stored in the language model provided by step 204.

After the text has been segmented into text sections and after each text section has been assigned to a topic in step 202, in the proceeding step 206 a label is assigned to each text section as a section heading and inserted at the appropriate position in the text. The assignment of a label performed in step 206 makes explicit use of the label count statistics being provided to step 206 by step 205. Based on the training data, the label count statistics reflects how often a label is assigned to a topic.

After the text has been structured by means of segmenting the text into text sections, assigning a topic to each text section and further assigning a label to each text section, the segmented text, the assigned headings as well as alternatives are provided to a user in step 208. The alternatives provided to the user refer to alternative text segmentations as well as alternative section labels. In the proceeding step 210 the user decides whether to accept the performed segmentation of the text and the performed assignment of section labels or to select one of the provided alternatives. Furthermore the user can also enter an arbitrary segmentation as well as an arbitrary section heading according to his or her preference. After the user decision of step 210, in the following step 214 the method checks whether any modifications have been introduced by the user. When in step 214 no user introduced modification has been detected the method ends in step 218 resulting in a structured and labelled text as performed in step 206. In contrast when in step 214 a user introduced modification has been detected, the method proceeds with step 212 in which the user introduced modifications are processed and performed. The processing and performing of a user's decisions incorporates a multiplicity of different text segmentation, text labelling as well as text formatting procedures.

After the user decision has been processed and performed in step 212 the method proceeds with step 216. In step 216 the user introduced modifications are stored as external conditions for a next application of the structuring and assigning procedure. Depending on the type of user modification referring to the text structuring or to the label assignment of text sections after step 216, the method either returns to step 202 or to step 206 in which a new structuring or a new label assignment is performed.

In a similar way a new restructuring and reassignment of the text performed by step 202 and 206 explicitly accounts for already performed modifications provided by step 216. In this way it can be guaranteed that user performed modifications are never overruled by the text structuring step 202 and the label assignment step 206.

FIG. 3 is illustrative of an implementation of the text segmentation and topic assignment method into a speech recognition system. In step 300 speech is inputted into the system. In the following step 302 a first portion of the speech, p=1 is selected. The first portion of speech selected by step 302 is provided to step 304 performing a speech to text transcription by making use of a language model m. The language model m is provided by step 306 to step 304. After the speech portion p has been transcribed into a text portion t by step 304, the resulting text portion t corresponding to the speech portion p is stored in step 308. In the proceeding step 310 the speech portion index p is compared to $p_{max}$ indicating the last portion of the speech. If p is less than $p_{max}$, p is incremented by 1 and the method returns to step 304. The steps 304, 308 and 310 are repeatedly applied until the speech portion index p equals the last speech portion $p_{max}$. In this case the entire speech signal has been transcribed into text. The resulting text then comprises a plurality of text portions t corresponding to the portions of the speech. p.

Based on the transcribed text, in step 312, a segmentation of the text into text sections is performed and each of the text sections is assigned to a topic being specific of the content of each section. This segmentation procedure of step 312 makes use of statistical models designed for text segmentation that are provided to step 312 by step 314. When the text has been segmented and assigned to topics in step 312, in the succeeding step 116, the topic assigned to each text section as well as the corresponding speech portions p' of the text sections are determined. Based on this determination, a second speech recognition of the speech portions p' referring to a distinct section can be performed in the following step 318. Depending on the topic being assigned to a text section, a topic specific language model for the second speech recognition is provided by step 306. Since the speech has been transcribed stepwise in the procedure described by the steps 300 through 310, a repeated speech recognition can selectively be performed for distinct sections of text that correspond to speech portions p'.

When the repeated speech recognition step has been performed for each section of the text, a user can introduce further modifications referring to the segmentation of the text in step 320. According to the user introduced modifications of step 320, the method returns to the text segmenting step 312. Here, depending on the user's feedback, a new segmentation may take place and/or sections may be re-assigned to topics and labels.

When the performed text segmentations of step 312 and the repeated speech recognition of step 318 are both accepted by the user, the method ends with step 322.

The assignment between a topic and a section performed in step 316, as well as the speech transcription performed by step 304, can also make explicit use of a method of text segmentation and topic annotation as described in the patent application "Text segmentation and topic annotation for document structuring" and by the patent application "Topic specific models for text formatting and speech recognition" filed by the same applicant herewith concurrently.

In this way the expertise of a human proof reader can be universally and effectively coupled into a text segmentation and text labelling as well as into a corresponding speech recognition procedure.

FIG. 4 shows a block diagram of a user interface of the present invention. The user interface 400 is preferably adapted as a graphical user interface. The user interface 400 comprises a text window 402 and a suggestion window 404. The text that has been subject to text segmentation and label assignment is provided within the text window 402. A label 406 that has been inserted as a section heading into the text is highlighted for better retrieval within the text provided in the text window 402. When for example the user makes use of a pointer 408, the user can select the label 406 and in response to the selection of the label 406 a label list 410 is provided within the user interface. The label list 410 provides a whole set of labels 412, 414, 416 that serve as alternative labels that can be inserted instead of label 406 into the text.

Additionally or alternatively the label list 410 can also be provided within the suggestion window 404. By means of the pointer 408 the user can select one of the labels 412, 414, 416 provided by the label list 410 to replace the label 406 in the given text. When none of the labels 406, 412, 414, 416 matches the user's preferences, the user can enter a label by making use of the user input field 418. Once an alternative label has been selected or entered by the user, the label 406 is replaced by the alternative label. In a similar way the segmentation of the text with alternative text segmentations in the form of alternative section boundaries is provided to the user and can be performed upon a user's selection.

FIG. 5 shows a block diagram of a segmentation system of the present invention. The segmentation system 500 comprises a graphical user interface 520, a structured text module 518 for storing structured text, a processing unit 516, a statistical model module 514 storing statistical models, an unstructured text module 512 storing unstructured text and a speech recognition module 510 performing speech to text transcription. The segmentation system 500 is connected to an external storage device 508 and to an input device 504. A user 506 can interact with the segmentation system via the input device 504 and the graphical user interface 520 of the segmentation system 500.

Speech 502 that is inputted into the segmentation system is processed by the speech recognition module 510. The speech recognition module 510 is connected to the unstructured text module 512 where the unstructured text resulting from the speech to text transcription process is stored. The unstructured text module 512 is connected to the processing unit 516 in order to provide the unstructured text to the processing unit 516. The processing unit 516 is bidirectionally connected to the statistical model module 514. By making use of the statistical information provided by the statistical models stored in the statistical model module 514, the processing unit 516 performs a text segmentation and label assignment to sections of the text on the basis of the unstructured text provided by the unstructured text module 512. The speech recognition module makes further use of the language models stored and provided by the statistical model module. In this way the statistical model module provides language models for the text segmentation as well as language models for the speech recognition. The latter are typically of a different type compared to language models for text segmentation because speech recognition usually makes use of trigrams whereas text segmentation usually employs unigrams.

When the processing unit 516 has performed a text segmentation and an assignment of labels to text sections as section headings, the so generated structured text is stored in the structured text module 518. The structured text module is connected to the graphical user interface 520 in order to provide the structured text stored in the structured text module 518 to the user 506 by means of the graphical user interface 520. The user 506 can interact via the input device 504 with the segmentation system. Therefore the input device 504 is connected to the graphical user interface 520 and to the processing unit 516. When the user 506 introduces modifications of either the text structuring or the label assignment, the processing unit 516 performs a restructuring and a reassignment of the structured text stored in the structured text module 518. The restructured and reassigned structured text is repeatedly provided to the user until the performed modifications match the user's preferences. When no further changes are introduced by the user the structured text stored in the structured text module 518 is transmitted to the external storage device 508.

Furthermore structured text stored in the structured text module 518 can also be exploited for improved speech recognition that is performed by means of the speech recognition module 510. Therefore, the structured text module 518 is directly connected to the speech recognition module 510. Making use of this context specific feedback allows a more precise and specific speech recognition procedure to be performed by the speech recognition module 510.

The invention therefore provides a method of document structuring and assigning of labels to text sections serving as section headings. Especially in the field of automatic speech recognition and automatic speech transcription the proofreading task to be performed by a human proof reader is extremely facilitated. For the proposed segmentation of the text, it is much easier for the proof reader to check whether the text following some heading really represents a section of the corresponding type as opposed to conventional proof reading procedures where a portion of text has to be examined, a section has to be determined and a heading has to be inserted into the text by jumping back to the beginning of a section.

Furthermore the method supplies alternative section boundaries as well as alternative section labels that can easily be selected by the proof reader. Moreover during a proof reading process the system learns the most frequent corrections introduced by the proof reader and makes use of this information for future applications.

LIST OF REFERENCE NUMERALS

400 user interface
402 text window
404 suggestion window
406 label
408 pointer
410 label list
412 label
414 label
416 label
418 user input field
500 segmentation system
502 speech
504 input device
506 user
508 external storage device
510 speech recognition module
512 unstructured text module
514 statistical model module
516 processing unit
518 structured text module
520 graphical user interface

The invention claimed is:

1. A system comprising at least one processor programmed to:
   segment an unstructured text into a plurality of text sections;
   identify a portion of text that fully or partially identifies a section heading for a first text section of the plurality of text sections;
   remove, from the first text section, the portion of text that fully or partially identifies the section heading;
   create a structured text comprising the first text section and the section heading for the first text section, wherein the portion of text that fully or partially identifies the section heading has been removed from the first text section; and
   provide the structured text to a user.

2. The system of claim 1, wherein the section heading is a first section heading, and wherein the at least one processor is further programmed to:
   provide to the user a plurality of alternative section headings for the first text section.

3. The system of claim 2, wherein the structured text is a first structured text, and wherein the at least one processor is further programmed to:
   receive user input indicative of the user selecting an alternative section heading from the plurality of alternative section headings to replace the first section heading; and
   provide to the user a second structured text in which the first section heading has been replaced by the alternative section heading selected by the user.

4. The system of claim 1, wherein the at least one processor is further programmed to:
   receive user input indicative of the user disapproving the section heading; and
   in response to the user input, re-insert the portion of text that fully or partially identifies the section heading into the first text section.

5. The system of claim 1, wherein the at least one processor is further programmed to:

receive user input indicative of the user wishing to move a border between a second text section and a third text section from a first position in the structured text to a second position in the structured text; and provide to the user a second structured text in which the border between the second text section and the third text section has been moved to the second position indicated by the user.

6. The system of claim 5, wherein the at least one processor is further programmed to:

re-segment the structured text while leaving the border between the second text section and the third text section at the second position indicated by the user.

7. The system of claim 1, wherein the at least one processor is further programmed to:

select the section heading based at least in part on a topic assigned to the first text section.

8. A method comprising acts of:

segmenting an unstructured text into a plurality of text sections;

using at least one processor to identify a portion of text that fully or partially identifies a section heading for a first text section of the plurality of text sections;

removing, from the first text section, the portion of text that fully or partially identifies the section heading;

creating a structured text comprising the first text section and the section heading for the first text section, wherein the portion of text that fully or partially identifies the section heading has been removed from the first text section; and providing the structured text to a user.

9. The method of claim 8, wherein the section heading is a first section heading, and wherein the method further comprises:

providing to the user a plurality of alternative section headings for the first text section.

10. The method of claim 9, wherein the structured text is a first structured text, and wherein the method further comprises:

receiving user input indicative of the user selecting an alternative section heading from the plurality of alternative section headings to replace the first section heading; and providing to the user a second structured text in which the first section heading has been replaced by the alternative section heading selected by the user.

11. The method of claim 8, further comprising:

receiving user input indicative of the user disapproving the section heading; and in response to the user input, re-inserting the portion of text that fully or partially identifies the section heading into the first text section.

12. The method of claim 8, further comprising:

receiving user input indicative of the user wishing to move a border between a second text section and a third text section from a first position in the structured text to a second position in the structured text; and providing to the user a second structured text in which the border between the second text section and the third text section has been moved to the second position indicated by the user.

13. The method of claim 12, further comprising:

re-segmenting the structured text while leaving the border between the second text section and the third text section at the second position indicated by the user.

14. The method of claim 8, further comprising:

selecting the section heading based at least in part on a topic assigned to the first text section.

15. At least one non-transitory computer-readable medium having stored thereon instructions that, when executed by at least one processor, perform a method comprising acts of:

segmenting an unstructured text into a plurality of text sections;

using at least one processor to identify a portion of text that fully or partially identifies a section heading for a first text section of the plurality of text sections;

removing, from the first text section, the portion of text that fully or partially identifies the section heading;

creating a structured text comprising the first text section and the section heading for the first text section, wherein the portion of text that fully or partially identifies the section heading has been removed from the first text section; and providing the structured text to a user.

16. The at least one non-transitory computer-readable medium of claim 15, wherein the section heading is a first section heading, and wherein the method further comprises:

providing to the user a plurality of alternative section headings for the first text section.

17. The at least one non-transitory computer-readable medium of claim 16, wherein the structured text is a first structured text, and wherein the method further comprises:

receiving user input indicative of the user selecting an alternative section heading from the plurality of alternative section headings to replace the first section heading; and providing to the user a second structured text in which the first section heading has been replaced by the alternative section heading selected by the user.

18. The at least one non-transitory computer-readable medium of claim 15, wherein the method further comprises:

receiving user input indicative of the user disapproving the section heading; and in response to the user input, re-inserting the portion of text that fully or partially identifies the section heading into the first text section.

19. The at least one non-transitory computer-readable medium of claim 15, wherein the method further comprises:

receiving user input indicative of the user wishing to move a border between a second text section and a third text section from a first position in the structured text to a second position in the structured text; and providing to the user a second structured text in which the border between the second text section and the third text section has been moved to the second position indicated by the user.

20. The at least one non-transitory computer-readable medium of claim 19, wherein the method further comprises:

re-segmenting the structured text while leaving the border between the second text section and the third text section at the second position indicated by the user.

* * * * *